(12) United States Patent
Sotgiu

(10) Patent No.: US 11,001,108 B2
(45) Date of Patent: May 11, 2021

(54) MOUNTING/DEMOUNTING TOOL UNIT WITH PRELOADED TOOL

(71) Applicant: Snap-on Equipment Srl a unico socio, Correggio (IT)

(72) Inventor: Paolo Sotgiu, Modena (IT)

(73) Assignee: Snap-on Equipment Srl a unico socio, Correggio (IT)

( * ) Notice: Subject to any disclaimer, the term of this patent is extended or adjusted under 35 U.S.C. 154(b) by 1240 days.

(21) Appl. No.: 14/292,798

(22) Filed: May 30, 2014

(65) Prior Publication Data

US 2015/0343863 A1 Dec. 3, 2015

(51) Int. Cl.
*B60C 25/132* (2006.01)
*B60C 25/05* (2006.01)

(52) U.S. Cl.
CPC ........ *B60C 25/132* (2013.01); *B60C 25/0578* (2013.01)

(58) Field of Classification Search
CPC . B60C 25/132; B60C 25/0578; B60C 25/138; B60C 25/04; B60C 25/135
USPC ................................ 157/1.24, 1.22
See application file for complete search history.

(56) References Cited

U.S. PATENT DOCUMENTS

| | | | | |
|---|---|---|---|---|
| 1,538,875 A | * | 5/1925 | Stevens | B60C 25/132 157/1.24 |
| 3,142,330 A | * | 7/1964 | Nelson | B60C 25/025 157/1.17 |
| 3,426,827 A | * | 2/1969 | Lydle | B60C 25/132 157/1.26 |
| 3,742,999 A | * | 7/1973 | Myers, Jr. | B60C 25/0524 157/1.28 |
| 4,209,053 A | * | 6/1980 | du Quesne | B60C 25/132 157/1.24 |
| 4,884,611 A | * | 12/1989 | Schmidt | B60B 30/06 157/1.17 |

(Continued)

FOREIGN PATENT DOCUMENTS

| | | |
|---|---|---|
| CN | 1935540 A | 3/2007 |
| CN | 102785540 A | 11/2012 |

(Continued)

OTHER PUBLICATIONS

European Search Report issued in European Application No. 14170632.5-1760 dated Nov. 18, 2014.

(Continued)

*Primary Examiner* — Joseph J Hail
*Assistant Examiner* — Arman Milanian
(74) *Attorney, Agent, or Firm* — Studebaker & Brackett PC

(57) ABSTRACT

The present invention relates to a mounting/demounting tool unit for mounting a tyre to or demounting a tyre from a rim of a vehicle wheel and for being adapted to be attached to a tyre mounting/demounting machine, including: a longitudinally extending tool carrier arm having a center line and a first as well as a second end, a mounting/demounting tool having a first as well as a second end and a hook arranged in the region of the second end, and being pivotally mounted to the tool carrier arm in the region of its first end, wherein means for reversibly urging the mounting/demounting tool in a resting/operating position and for positioning the mounting/demounting tool in said resting/operating position are provided.

17 Claims, 7 Drawing Sheets

(56) References Cited

U.S. PATENT DOCUMENTS

| | | | | |
|---|---|---|---|---|
| 5,050,659 A | * | 9/1991 | Scalambra | B60B 30/06 157/1.24 |
| 7,798,196 B2 | * | 9/2010 | Gonzaga | B60C 25/13 157/1.22 |
| 8,973,640 B1 | * | 3/2015 | Hanneken | B60C 25/138 157/1.17 |
| 2002/0162633 A1 | * | 11/2002 | Mimura | B60C 25/0578 157/1.24 |
| 2004/0055712 A1 | * | 3/2004 | Corghi | B60C 25/138 157/1.24 |
| 2006/0027334 A1 | * | 2/2006 | Boni | B60C 25/0593 157/1.24 |
| 2006/0254725 A1 | * | 11/2006 | Gonzaga | B60C 25/138 157/1.17 |

FOREIGN PATENT DOCUMENTS

| | | | | |
|---|---|---|---|---|
| EP | 2524821 A1 | * | 11/2012 | B60C 25/138 |
| EP | 2524821 A1 | | 11/2012 | |
| WO | 2009/138322 A1 | | 11/2009 | |

OTHER PUBLICATIONS

Chinese Office Action from Chinese Patent Application No. 2015102908398, dated Jun. 22, 2017.

* cited by examiner

MOUNTING/DEMOUNTING TOOL UNIT WITH PRELOADED TOOL

The present invention relates to a mounting/demounting tool unit for mounting a tyre to or demounting a tyre from a rim of a vehicle wheel and for being adapted to be attached to a tyre mounting/demounting machine, as well as to a tyre mounting/demounting machine itself.

In practice, tyre mounting/demounting machines are known for mounting a tyre to or demounting a tyre from a rim of a vehicle wheel which comprise a wheel support having a shaft and clamping means for rotatably and reversibly holding a rim of a wheel from which a tyre is to be demounted or to which a tyre is to be mounted during the mounting/demounting procedure. Mounting and demounting tools being provided on tool carrier arms, are supported at a tool support post along which the tool carrier arms can be moved. The tools can include bead breakers for loosening the tyre bead from the rim edge. Moreover, the tools can also comprise a removal tool for gripping and moving the tyre bead of the tyre to be demounted out of the rim.

EP patent 1 398 184 discloses a tyre demounting tool that is pivotally attached to a tool carrier arm. The demounting tool has a hook element arranged at its front end for engaging the tyre bead of a tyre to be demounted from the wheel rim.

Two piston/cylinder arrangements are provided at the tool arm for positioning and operating the demounting tool during the demounting process.

From EP patent 1 714 807, a demounting tool is known which comprises a plateshaped tool member for engaging into the space between the wheel rim and the tyre bead wherein the tool has a hook at its front end. The tool member is pivotally coupled to a tool carrier arm by an intermediate element to enable a linear as well as a pivotal movement of the tool member during the demounting process.

In EP patent application 2 692 553, a hook-shaped tyre demounting tool for demounting a tyre from a rim is disclosed which is pivotally attached by its one end to a tool carrier arm. Its other or free end provided with a hole, faces towards the tyre to be demounted from the rim. In an insertion position, the free end of the demounting tool is brought into a position, in which it abuts against the wheel rim edge close to the tyre bead, and is inserted between the tyre and the wheel rim. During the further demounting process, the tool is initially guided by the rim and pivots into an extraction position after the whole of the tool has passed the tyre bead. After the demounting process, a returning spring pivots the tool back into the insertion position.

These known demounting tools are of complex design which includes a large number of parts and/or separate drives for actuating them. Moreover, these known devices do not allow both, mounting and demounting of a tyre to or from a wheel rim. Additionally, in particular in the device of EP patent application 2 692 553, the hook-shaped end of the demounting tool has to be brought into an accurate position relative to the wheel rim edge in order to avoid that the tool pivots uncontrolled. In particular, the tool has to be brought in a position very close to the rim so that the side surface of the tool facing to the rim can not pivot in the direction to the rim. Due to the close position of the tool related to the rim edge, the tool abuts to the rim in case that a moment acts on the tool which pivot the tool in the direction of the rim. Thus, a very precise control is needed for this known demounting tool which leads either to additional time in case that the tool is positioned by an operator, or to increased efforts for the controlling unit in case the tool is positioned by a machine.

Thus, it is an object of the present invention to provide a mounting/demounting tool unit for mounting and demounting a tyre to or from a wheel rim with the same tool which is of a simple construction and which needs less control efforts, and to provide a tyre mounting/demounting machine to which the inventive mounting/demounting tool unit is attached, and in which the control amount is reduced.

According to the present invention and for solving the above identified technical problem, there is provided a mounting/demounting tool unit for mounting a tyre to or demounting a tyre from a rim of a vehicle wheel and for being adapted to be attached to a tyre mounting/demounting machine, including: a tool carrier arm having a center line and a first as well as a second end, and a mounting/demounting tool having a first as well as a second end and a hook arranged in the region of the second end, and being pivotally mounted to the tool carrier arm in the region of its first end, wherein means for reversibly urging the mounting/demounting tool in a resting/operating position and for positioning the mounting/demounting tool in said resting/operating position are provided.

It has to be noted that the tool carrier arm may have any suitable design. In an advantageous embodiment, the tool carrier arm has at least a longitudinal extension. This longitudinal extension enables the tool carrier arm to bridge a possible distance between the support of the tool carrier arm on a respective tyre mounting/demounting machine and the support for a wheel to be treated.

Moreover, due to the fact that the mounting/demounting tool of the inventive mounting/demounting tool unit is reversibly urged in a resting/operating position by the means for reversibly urging the mounting/demounting tool in a resting/operating position and for positioning the mounting/demounting tool in said resting/operating position, a very effective, but simple construction for a mounting/demounting tool unit as well as a simple control for the tool can be reached. Due to the fact that the mounting/demounting tool is held in position by the means for reversibly urging the mounting/demounting tool in a resting/operating position and for positioning the mounting/demounting tool in said resting/operating position, there is no need to position the tool at a specific location like it is necessary for the dissembling tool of EP patent application 2 692 553. In case that a moment acts on the tool which would causes a pivot movement of the tool in the direction to the tyre or rim, respectively, the means for reversibly urging the mounting/demounting tool in a resting/operating position and for positioning the mounting/demounting tool in said resting/operating position avoid a rotation movement in this direction. On the other hand, a rotation movement in the other direction, i.e. in the direction toward the tool carrier arm, can still be carried out so that the tool can grip the tyre bead as soon as the tool has passed the tyre bead during its movement toward the center plane of the rim. The pushing force being necessary for removing the tyre bead from the rim edge is established by the means for reversibly urging the mounting/demounting tool in a resting/operating position and for positioning the mounting/demounting tool in said resting/operating position by which the mounting/demounting tool is held in the resting/operating position and secured against rotational movement in a direction contrary to the moving direction towards the tyre/rim. When the tool carrier arm is further moved in the direction parallel to the rotational axis of the tyre, then the mounting/demounting tool can be pivoted in the direction to the tool carrier arm so that any damage of the rim edge can be avoided, and the hook of the mounting/demounting tool is able to grip the tyre bead after the tool has passed the tyre bead. Furthermore, due to the support of the mounting/demounting tool restricting its rotational movement in the resting/operating position, the mounting/demounting tool can also be used during a mounting operation for urging the tyre bead below the rim edge of a rim.

It has to be noted that means for reversibly urging the mounting/demounting tool in a resting/operating position and for positioning the mounting/demounting tool in said resting/operating position can be designed in different embodiments. For example, the means for reversibly urging the mounting/demounting tool in a resting/operating position and for positioning the mounting/demounting tool in said resting/operating position can be designed as tensioning and portioning means. In the following, various designs are explained in greater detail.

Furthermore, it has to be noted that the inventive design is independent from the orientation of the rim from which a tyre is to be demounted or to which a tyre is to be mounted, i.e. the rim can be clamped to a shaft of a wheel support such that the center plane of the rim is arranged horizontally or vertically or any other orientation between a horizontal and a vertical plane, respectively.

The means for reversibly urging the mounting/demounting tool in a resting/operating position and for positioning the mounting/demounting tool in said resting/operating position can in principle be designed in two different ways: The functionality of the means for reversibly urging the mounting/demounting tool in a resting/operating position and for positioning the mounting/demounting tool in said resting/operating position can be combined in one type of machine element or machine part, respectively. For example, a tensioning element can be provided which holds the mounting/demounting tool in the resting/operating position. If, for example, the tensioning element is a spiral wounded tension spring, the resting/operating position is defined by this spiral wounded tension spring in its fully compressed state. Due to this, a rotation movement of the mounting/demounting tool in a direction toward the rim is avoided. However, a rotation movement in the other direction, i.e. in the direction toward the tool carrier arm is still possible. When the tensioning element is tensioned during the rotating movement of the mounting/demounting tool for gripping the tyre bead, the mounting/demounting tool moves back in the resting/operating position by the means for reversibly urging the mounting/demounting tool in a resting/operating position and for positioning the mounting/demounting tool in said resting/operating position after the tyre bead has been demounted from the rim.

The tensioning element can have a first and a second end, wherein the first end is attached to the tool carrier arm and the second end is attached to the mounting/demounting tool. This allows a very compact design of the mounting/demounting tool unit.

It has to be noted that in case that the functionality of tensioning and positioning of the means for reversibly urging the mounting/demounting tool in a resting/operating position and for positioning the mounting/demounting tool in said resting/operating position is combined in one type of machine element, it is in principle possible that several machine elements of the same type can be provided. For example, several tensioning elements can be provided as the means in order to fulfilling the tensioning and positioning functionality.

In a second principle way, the functionality of tensioning and positioning of the means for reversibly urging the mounting/demounting tool in a resting/operating position and for positioning the mounting/demounting tool in said resting/operating position can be splitted in at least two types of machine elements. In other words, there can be provided a first machine element for the tensioning functionality of the means for reversibly urging the mounting/demounting tool in a resting/operating position and for positioning the mounting/demounting tool in said resting/operating position, and a second type of machine element for carrying out the positioning functionality of the means for reversibly urging the mounting/demounting tool in a resting/operating position and for positioning the mounting/demounting tool in said resting/operating position. In preferred embodiment for this principle way, the means for reversibly urging the mounting/demounting tool in a resting/operating position and for positioning the mounting/demounting tool in said resting/operating position include positioning elements which are provided at the tool carrier arm and the mounting/demounting tool, and a tensioning element which is attached to the tool carrier arm and the mounting/demounting tool.

In this configuration, the positioning elements determine the resting/operation position of the mounting/demounting tool, and secure the mounting/demounting tool against further rotation. For carrying out the tensioning functionality, at least one tensioning element as a part of the means for reversibly urging the mounting/demounting tool in a resting/operating position and for positioning the mounting/demounting tool in said resting/operating position can be provided. The tensioning element, in the resting/operating position, necessarily has to be in its relaxed state, for not providing additional tension to the mounting/demounting tool. Alternatively, an elastic tensioning element may comprise means for restricting further compression, like a sleeve covering said elastic element, or a suitable bolt. It has further to be noted that the tensioning element may not necessarily be an elastic element. The tensioning function may also be executed by other elements, like a counter weight which is coupled to the mounting/demounting tool for urging the mounting/demounting tool in the resting/operating position.

According to a further embodiment of the inventive mounting/demounting tool unit, the tool carrier arm may be provided with a tool support surface as a first positioning element, and the mounting/demounting tool may have a counter-support surface as a second positioning element in the region of its first end, wherein the tool support surface and the counter-support surface form the positioning elements such that, in the resting/operating position, the counter-support surface of the mounting/demounting tool is in engagement with the tool support surface of the tool carrier arm. Additionally, the positioning elements of this embodiment also restrict the rotation of the tool, particularly, secure the mounting/demounting tool in the resting/operating position against further rotation in a direction contrary to the moving direction of the tool towards the tyre/rim.

In this very effective, but simple construction for a mounting/demounting tool unit, the pushing force being necessary for removing the tyre bead from the rim edge is established by the counter-support surface of the mounting/demounting tool which is in engagement with the tool support surface of the tool carrier arm when in the resting position, and which also forms an operating position of the mounting/demounting tool.

For the pivoting movement, it is advantageous that the tool carrier arm includes at its second end a pivot axis the center line of which extends vertically to the center line of the tool carrier arm and around which the mounting/demounting tool can reversibly pivot. In principle, it is also possible that the mounting/demounting tool is provided with a shaft which is rotatably seated in the tool carrier arm. The shaft has then the same orientation as the pivot axis mentioned previously.

According to a further preferred arrangement, the second end of the tool carrier arm is provided with a fork or clevis, respectively, having a first as well as a second tine or prong, respectively, and a fork base connecting the tines, wherein the mounting/demounting tool is at least partially arranged pivotally in the space defined by the tines and the fork base. The tines as well as the fork base define a space being open in the direction of the second end of the tool carrier arm and in a direction extending vertically thereto. This design allows a compact construction of the inventive mounting/demounting tool unit. Although the mounting/demounting tool is guided by the pivot axis during its pivoting movement, at least one of the surfaces of the tines facing to each other can be used as an additional guiding means for guiding the mounting/demounting tool during its pivoting movement.

Additionally or independent from the foregoing, the mounting/demounting tool can be provided at its first end with a fork or clevis, respectively, with two tines or prongs, respectively, wherein the prongs of this clevis can be formed by projections being part of the mounting/demounting tool. The prongs of the clevis of the mounting/demounting tool can be arranged such that they define a second space being open in the direction of the first end of the mounting/demounting tool and in a direction which extends vertically when the tool carrier arm and the mounting/demounting tool are mounted to each other. Thus, both pairs of tines or prongs of the mounting/demounting tool and the tool carrier arm overlap each other for some extent so that the two forks or clevis, respectively, defined by the pair of tines of tool carrier arm and by the pair of projections of mounting/demounting tool interlock or mesh with each other.

For further supporting the compact design of the inventive mounting/demounting tool unit, it is preferred that the counter-support surface of the tool carrier arm is arranged in the region of the fork base. In particular, the counter support surface of the tool carrier arm can extend from the edge of the fork base in the direction of the first end of the tool carrier arm.

For providing in an easy way the counter support surface of the mounting/demounting tool, it is of advantage when the mounting/demounting tool has at its first end at least one projection at which its counter-support surface is arranged such that it faces towards the tool support surface of the tool carrier arm when both components are assembled to each other. Thereby, the tool support surface can be designed such that a relatively large engagement area is defined between the counter-support surface of the mounting/demounting tool and the tool support surface of the tool carrier arm.

Additionally or independently from the foregoing, a second projection can be provided at the mounting/demounting tool in the region of its first end such that this projection will come in contact with the tool carrier arm on the opposed side of the tool support surface. This projection can be used as an abutment for the pivoting movement of the mounting/demounting tool starting from its resting/operating position.

In order to avoid a possible damage of the rim edge of the wheel, it is of advantage when the second end of the mounting/demounting tool is part of an extension of the mounting/demounting tool in the form of an at least slightly curved finger the tip of which is directed at least substantially in the facing direction of the counter-support surface of the mounting/demounting tool. In case that the mounting/demounting tool pivots from its resting/operating position in the direction of its second end or the finger tip, respectively, this design allows a passing of the second end of the mounting/demounting tool at the rim edge without the risk of any damage of said rim edge.

Additionally or independent from the foregoing, it is of advantage when the mounting/demounting tool is provided at its second end with at least one auxiliary guiding surface having a flat design facing away from the tool arm, i.e. in the direction of the wheel to be operated. This flat auxiliary guiding surface can slightly pass along the rim edge without producing a high contact pressure between the mounting/demounting tool and the rim edge in case that the mounting/demounting tool comes accidently or willingful in contact with the rim edge of the wheel to be operated. As already stated above, one of the advantages of the present invention lies in the fact that there is a need for a precise positioning of the tool when the tool contacts the tyre for the demounting process. Due to the auxiliary guiding surface, a contact of the tool with the tyre close to the rim edge is possible without the risk of damaging the rim.

In a preferred embodiment, the second end of the mounting/demounting tool has a step-shaped design. Thereby, the step-shaped design can be provided on the one side of the mounting/demounting tool facing towards the wheel to be operated and/or on the side of the mounting/demounting tool facing in the direction to the tool carrier arm.

For having a safe grip of the hook, it is of advantage when the hook faces towards the tool carrier arm and the hook opening in the direction to the center line of the tool carrier arm. This step-shaped design allows the tool to pass smoothly by a preferably superimposed rotational and longitudinal movement to the rim edge when it is moved deeper inside the tyre to grip the tyre bead.

With respect to a mounting/demounting machine for mounting a tyre to or demounting a tyre from a rim of a vehicle wheel, the above-mentioned object is solved by an inventive mounting/demounting machine for the purpose mentioned-above, which comprises a wheel support having a shaft with a center line and clamping means for rotatably and reversibly holding a rim of a wheel from which a tyre is to be demounted or to which a tyre is to be mounted, at least one mounting/demounting unit according to the invention, and a tool support post with a center line for supporting the inventive mounting/demounting unit, wherein the center line of the tool support post extends at least substantially parallel to the center line of the shaft of the wheel support.

For being able to adapt the position of the mounting/demounting unit to different sizes of wheels, it is of advantage when the mounting/demounting tool unit is reversibly movable along the tool support post such that at least one component of the movement of the mounting/demounting tool unit is aligned at least approximately parallel to the center line of the tool support post and/or at least approximately perpendicular to the center line of the tool support post. In other words, the mounting/demounting tool unit may reversibly be moved not only in a horizontal direction or in a vertical direction, but also in a direction which is a combination of said horizontal and vertical direction.

For assisting the mounting of a tyre to a rim, it is of further of advantage when a bead breaker carrier arm with a first as well as a second end and a center line is provided, wherein the first end is mounted to the tool support post and the second end carries a bead breaker tool, and wherein, in the region of the second end, a mounting support tool is provided which can be pivoted reversibly from a resting position into an operating position around a pivot axis which is mounted to the bead breaker carrier arm and the center line of which extends vertically to the center line of the bead breaker carrier arm. This mounting support tool can be used for gripping the bead of a tyre and drawing the bead of the tyre over the rim edge during a mounting process. In particular, if this mounting support tool is provided at the bead breaker carrier arm being located on the opposite side of the rim from which the mounting of a tyre starts, the mounting support tool can be used to draw the bead of the tyre over the first rim edge of the wheel until reaching the second rim edge of said rim. Moreover, the mounting support tool can be is pivoted manually or a drive can be provided for an automatic movement of that mounting support tool.

It has to be noted that, instead of being adapted to be pivoted reversibly from a resting position into an operating position around a pivot axis, the mounting support tool can be provided at its end opposite to its mounting support tool element with a design being adapted to be mounted temporally to support means which are provided at the bead breaker carrier arm. Thus, the mounting support tool can be mounted to the bead breaker carrier arm if needed, and can easily be removed therefrom if not needed.

In order to allow a proper positioning of the mounting support tool in the operating position, it is of advantage when the mounting support tool has a shape which corresponds to the bead breaker tool or which is at least partially congruent to the shape of the bead breaker tool such that the mounting support tool can closely abut to the bead breaker tool in its operating position, and wherein the mounting support tool includes preferably a hook for gripping in its operating position the bead of a tyre to be mounted to the rim of a wheel. If, for example, the bead breaker tool is formed by a disc having a conical shape, it is of advantage if the mounting support tool is formed by a ring the inner diameter of which is such that the ring abuts against a preferably conical surface of the bead breaker tool.

Alternatively to a mounting support tool described above, a further inventive mounting/demounting tool assembly for a tyre mounting/demounting apparatus may be provided. The mounting/demounting tool assembly comprises: a carrier unit having a first as well as a second end and being provided with first support means for receiving a bead breaker tool as well as second support means for receiving a mounting support tool, a bead breaker tool for loosening the tyre bead from the rim edge of a wheel, having a first as well as a second end, the first end is provided with at least one bead breaker tool element and the second end is adapted to be mounted to the carrier unit via the first support means, and a mounting support tool for supporting the mounting of at least one tyre bead of a tyre to be mounted on a rim, the mounting support tool having a first as well as a second end, the first end is provided with at least one mounting support tool element and the second end is adapted to be mounted to the carrier unit via the second support means. In the inventive mounting/demounting tool assembly, the shape of the bead breaker tool element and the shape of the mounting support tool and/or the mounting support tool element are at least partially congruent to each other.

Such a mounting/demounting tool assembly thereby enables to provide both, a bead breaker and a mounting support tool, on the same tool carrier arm. Thus, no additional tool carrier arm for the bead breaker is necessary, whereby the design and control amount of the mounting/demounting machine is reduced. Additionally, the least partially congruent shapes of the bead breaker tool element and the mounting support tool and/or the mounting support tool element provide sufficient supporting contact between the bead breaker tool element and the mounting support tool and/or its tool element for preventing unintentional vertical or lateral movement during the mounting process. In an advantage configuration, the mounting support tool in the region of its first end has a shape that is at least partially congruent to the shape of the bead breaker tool element.

In this arrangement, the support of the mounting support tool and/or its tool element by the bead breaker tool element is provided close to the first end of the mounting support tool, where the mounting support tool element is arranged. Thereby, unintentional movement of the mounting support tool element, e.g. caused by bending of the mounting support tool, may be omitted.

In a preferred embodiment of the mounting/demounting tool assembly, the mounting support tool is pivotally attached to the second support means of the carrier unit with its second end, for being reversibly pivoted between an inoperative position and an operative position.

The pivot movement is a non-complex movement and can be executed manually or automatically with a simple mechanism, whereby the control effort may be reduced.

For further reducing the control effort, e.g. by omitting an additional drive, the bead breaker tool may be fixedly attached to the first support means of the carrier unit in its operative position. Naturally, the bead breaker tool may also be removable attached to the first support means of the carrier unit. In this case, the bead breaker tool is in its operative position when mounted to the carrier arm unit, and in its inoperative position when removed from the carrier arm unit.

In an alternative embodiment, the bead breaker tool has an operative position and an inoperative position, and wherein the bead breaker tool is pivotally attached to the first support means of the carrier unit with its second end, for being reversibly pivoted between the inoperative position and the operative position.

The mounting support tool may have any suitable shape and may be realized in various designs. In an advantageous configuration, the mounting support tool has an operative position for supporting the mounting of a tyre bead wherein the mounting support tool has in the region of its first end an engagement portion for being adapted to come at least partially into engagement with the bead breaker tool element, when in its operative position. The specific shape of the engagement portion of the mounting support tool enables sufficient supporting contact between the mounting support tool and the bead breaker tool during the mounting process, prevents unintentional. e.g. lateral or vertically downward movement of the mounting support tool, and secures the mounting support tool in its operative position.

The engagement portion of the mounting support tool may have any suitable shape, which e.g. at least partially matches the shape of the bead breaker tool element. It is preferred that the bead breaker tool element has a conical shape, like a complete cone having a tip end or a truncated cone with a planar top surface, and the engagement portion of the mounting support tool has an at least approximately circular shape adapted to be engaged by the bead breaker tool element, when the mounting support tool is in its operative position.

In case that the bead breaker tool element is of a conical shape, the engagement portion of the mounting support tool may have an at least approximately ring-shape which is engaged by the bead breaker tool element, when the mounting support tool is in its operative position. A ring-shaped engagement portion enables a correct positioning on and a secure engagement of the mounting support tool by the bead breaker tool element.

The engagement portion may also have any other suitable shape which may be engaged by the bead breaker tool element, like a conical cap, or any suitable opening into which the bead breaker tool element may engage, like a rectangular or triangular opening. Naturally, in case that the bead breaker tool element has a shape different from the conical shape, like a cylindrical shape, also the engagement portion may have a non-conical shape at least partially matching the shape of the bead breaker tool element.

The pivot movement of the mounting support tool between an inoperative or resting position and an operative position enables a correct and easy positioning of the mounting support tool in the operative position. In this position, the engagement portion of the mounting support tool is supported by the bead breaker tool element, whereby unintentional vertical or lateral movement during the mounting process may be omitted.

For enabling the mounting of at least one of the tyre beads to the rim, and for preventing the respective tyre bead from being damaged, in a preferred configuration, the mounting support tool element has a guiding surface for guiding the at least one tyre bead of a tyre to be mounted on a rim.

In a specific embodiment of the mounting/demounting tool assembly, the mounting support tool element is at least approximately hook-shaped, and the guiding surface is arranged at the inner side of the hook-shaped mounting support tool element facing in the direction of the second end of the carrier unit. It has to be understood that the inner surface of the hook-shaped mounting support tool element faces away from the rim and towards the tyre to be mounted on the rim. A hook-shaped mounting support tool element enables a secure engagement and guidance of the tyre bead during the mounting process.

According to a further preferred embodiment of the tyre mounting/demounting tool assembly, the carrier unit comprises an adapter portion adapted to be mounted to a tool carrier arm of a tyre mounting/demounting machine, in particular to an already existing tool carrier arm.

Said adapter portion allows an easy and secure positioning of the inventive tyre mounting/demounting tool assembly to the tool carrier arm of different tyre mounting/demounting machines. This means that the inventive tyre mounting/demounting tool assembly may be provided as an accessory or upgrade assembly for existing tyre mounting machines.

According to an alternative embodiment, the carrier unit may be a part of a tool carrier arm of a tyre mounting/demounting machine. In this configuration, the control unit of the specific tyre mounting/demounting machine may be adapted to the specific embodiment of the mounting/demounting tool assembly.

There may further be provided a mounting support tool for supporting the mounting of at least one tyre bead of a tyre to be mounted on a rim. The mounting support tool has a first as well as a second end, the first end is provided with a mounting support tool element and the second end is adapted to be mounted to the tool carrier arm, particular to the lower bead breaker arm of an existing tyre mounting/demounting machine. In this configuration, the mounting support tool may be provided as an upgrade part for being mounted to a tool carrier arm of an existing tyre mounting/demounting machine.

It has to be understood that the mounting support tool may be of a configuration as disclosed herein. Moreover, it has to be noted that the inventive mounting support tool and the components belonging to it, as well as the inventive mounting support tool assembly, all as described above, can be used independently from the inventive mounting/demounting tool unit described also above.

Further advantages and embodiments of the present invention will be described in the following together with the drawings listed below. The expression "left", "right", "below" and "above" used in the following description, are referred to the drawings in an alignment such that the reference numbers and the notation of the figures used, can be read in normal.

Figure 1:
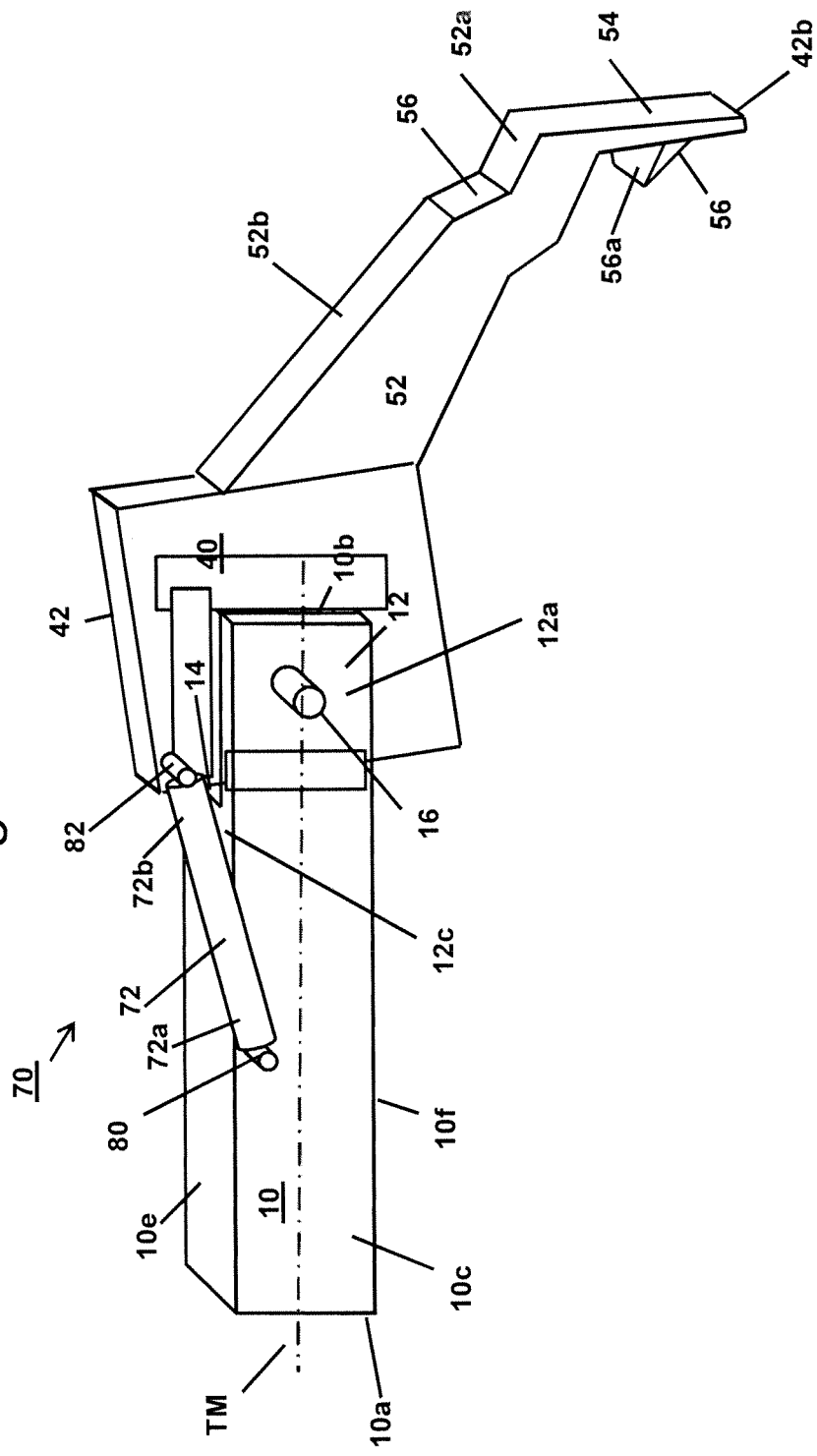
FIG. 1 is a schematic view to a first embodiment of a mounting/demounting tool unit according to the present invention, shown in the resting/operating position.

The first embodiment of an inventive mounting/demounting tool unit U shown in FIG. 1, includes as main components a tool carrier arm 10, a mounting/demounting tool 40 and means 70 for reversibly urging mounting/demounting tool 40 in a resting/operating position and for positioning mounting/demounting tool 40 in said resting/operating position. As it can be seen from FIG. 1, longitudinally extending tool carrier arm 10 is arranged with its center line TM in a horizontal orientation. However, the present invention is not restricted to such an orientation of tool carrier arm 10, but it is also possible that tool carrier arm 10 is provided such that its center line TM is vertically oriented or in an angle between a horizontal and vertical orientation or plane, respectively.

Tool carrier arm 10 according to FIG. 1 is made preferably from steel and has a rectangular- or square-shaped cross-section with a first end 10a and a second end 10b. With its first end 10a, tool carrier arm 10 can be mounted to a drive unit (not shown) for being adapted to be movable back and forth in a direction parallel to the orientation of its center line TM. At second end 10b, tool carrier arm 10 is provided with a fork 12 including a first tine 12a as well as a second tine 12b and a fork base 12c. Tines 12a, 12b are arranged at tool carrier arm 10 such that they extend parallel to each other and define together with fork base 12c a first space 14 being open in the upward and downward direction, referred to FIG. 1. Moreover, a pivot axis 16 is fixed in both tines 12a, 12b such that the center line of pivot axis 16 extends vertically to the center line TM of tool carrier arm 10. As it can be seen from FIG. 1, pivot axis 16 is arranged at least substantially in the longitudinally extending center lines of respective side surfaces 10c, 10d of tool carrier arm 10 and close to second end 10b of tool carrier arm 10.

Mounting/demounting tool 40 includes a tool body 42 with a first end 42a facing in the direction of first end 10a of tool carrier arm 10, and a second end 42b facing in the opposite direction to its first end 42a, i.e. in the direction of second end 10b of tool carrier arm 10. Tool body 42 is preferably made from steel and has a rectangular cross-section. Tool body 42 is rotatably attached to pivot axis 16.

Between tool body 42 and its second end 42b, an extension 52 is provided in the form of an at least slightly curved finger the tip of which forms second end 42b and is directed at least substantially in the facing direction of fork base 12c of fork 12. As it can be seen in FIG. 1, extension 52 has on its side opposite to first end 42a of tool body 42 an outer step-shaped contour with two steps 52a, 52b. The plane between second end 42b and first step 52a of extension 52 forms a first guiding surface 54 whereas second step 52b forms a second auxiliary guiding surface 55. On opposite side of second auxiliary guiding surface 55, a hook 56 is provided such that the hook opening 56a is directed upwardly.

According to the first embodiment, means 70 for reversibly urging mounting/demounting tool 40 in a resting/operating position and for positioning mounting/demounting tool 40 in said resting/operating position, which will further also be referred as tensioning and positioning means 70, are formed by a tension spring in form of a coil spring 72 or a spiral wounded tension spring. Coil spring 72 has a first end 72a and a second end 72b. First end 72a of coil spring 72 is attached to a first holding element 80 extending from tool carrier arm 10 whereas second end 72b is attached to a second holding element 82 extending from tool body 42 of mounting/demounting tool 40. As shown in FIG. 1, tensioning and positioning means 70 urges mounting/demounting tool 40 in the resting/operating position. In the resting/operating position, tensioning element 72 is in its maximum compressed state as well as first and second ends 72a, 72b of coil spring 72 are in closed contact with holding elements 80, 82 such that further rotation of mounting/demounting tool 40 in counter-clockwise direction, as seen in FIG. 1, is prevented. This resting position is simultaneously an operating position such that second end 42b of tool body 42 or finger tip of extension 52, respectively, can be brought in contact with a tyre bead of a tyre to be demounted from a rim of a vehicle wheel in the area of the rim edge and to urge said tyre bead out of the rim edge of said wheel rim during a demounting operation. Due to the firm contact between the loops of coil spring 72 which is in its maximum compressed state, a push force can be applied to push the tyre bead out of the rim edge. It has to be noted, that coil spring 72 in its maximum compressed state in this configuration, is also in its maximum relaxed state, in order not to apply any additional force to mounting/demounting tool 40, which would cause further rotation of mounting/demounting tool 40.

During the further demounting operation, mounting/demounting tool 40 can carry out a pivoting movement in the clockwise direction and in a counter-clockwise direction, such that first auxiliary guiding surface 54 is substantially oriented in a vertically direction. Thereby, extension 52, and in particular hook 56, can pass the tyre bead of tyre T already separated from the rim edge of the wheel rim and hook 56 can grip the inner side of the tyre bead. Afterwards, mounting/demounting tool unit U can be moved upwardly, referred to FIG. 1, and can draw the tyre bead griped by hook 56 out of the rim of wheel W. Any forces acting on mounting/demounting tool 40 can be balanced by tension element 72 of tensioning and positioning means 70 so that there is a firm contact between hook 56 and the tyre bead. Moreover, the step-shaped contour of extension 52, in particular first and second auxiliary guiding surfaces 54, 55 and step surfaces 52a, 52b, can come in contact with the rim edge and avoid thereby any damaging of said rim edge due to their plane design. After the tyre bead has been drawn out of the rim and has been detached from hook 56, mounting/demounting tool 40 returns back in its resting/operating position shown in FIG. 1.

Figure 2:
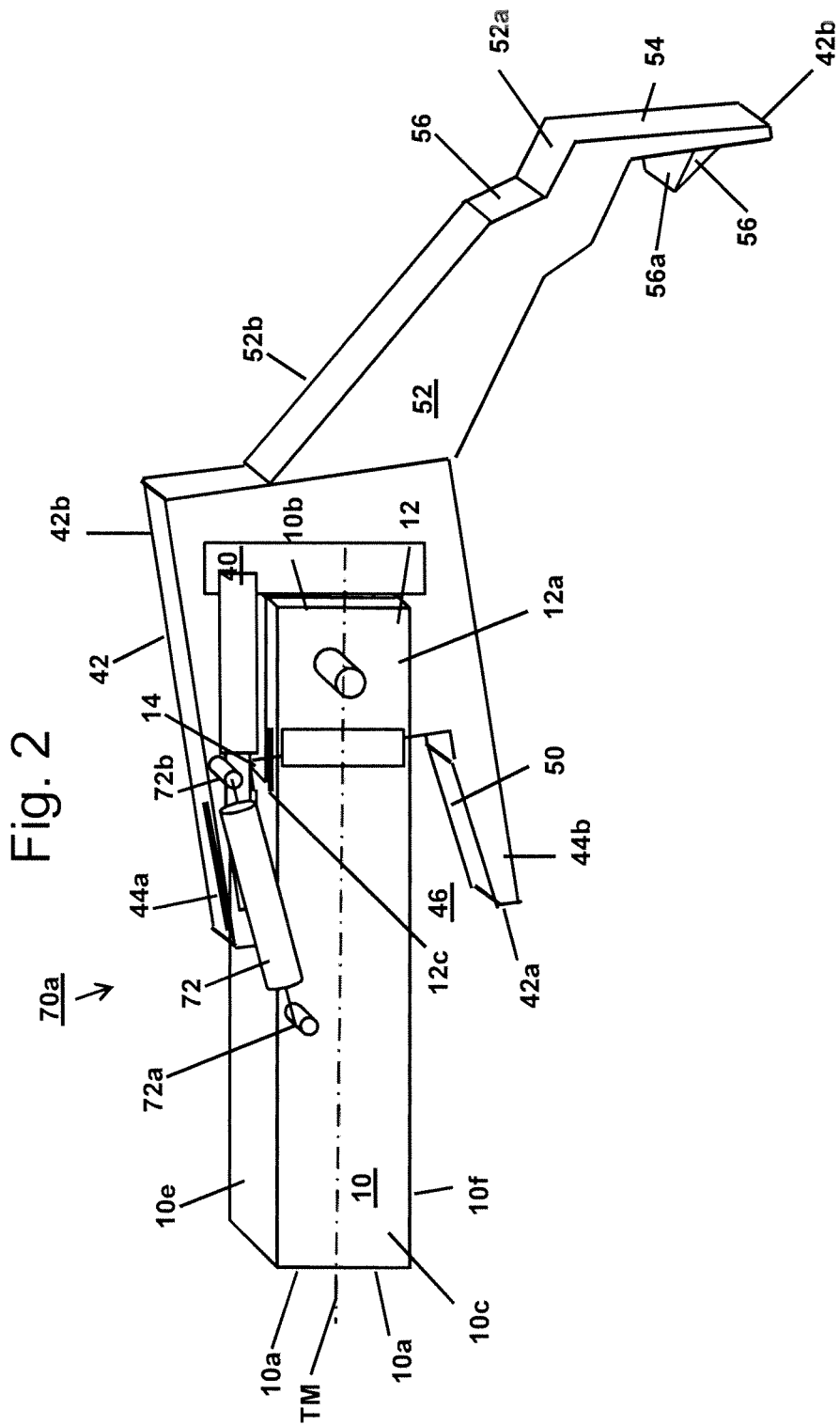
FIG. 2 is a schematic view to a second embodiment of a mounting/demounting tool unit according to the present invention, shown in the resting/operating position.
Figure 3:
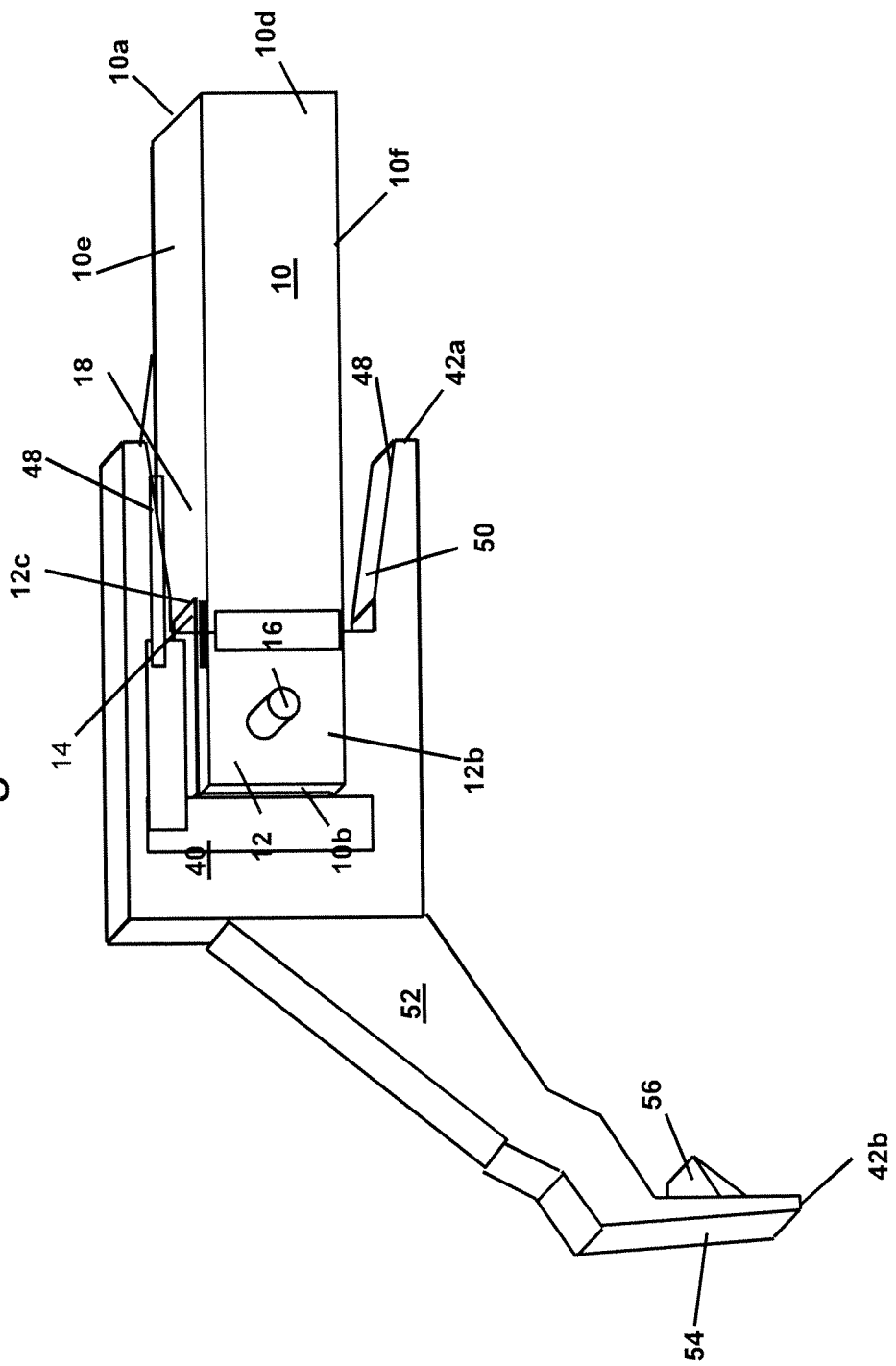
FIG. 3 is a further schematic view to the embodiment of the mounting/demounting tool unit of FIG. 2, shown from the opposite side referred to FIG. 1 and in an intermediate position.

A second embodiment of an inventive mounting/demounting tool unit U shown in FIGS. 2 and 3, includes as main components again a tool carrier arm 10, a mounting/demounting tool 40 and means 70 for reversibly urging mounting/demounting tool 40 in a resting/operating position and for positioning mounting/demounting tool 40 in said resting/operating position or tensioning and positioning means 70, respectively. As it can be seen from FIGS. 2 and 3, longitudinally extending tool carrier arm 10 is arranged with its center line TM in a horizontal orientation. However, the present invention is not restricted to such an orientation of tool carrier arm 10, but it is also possible that tool carrier arm 10 is provided such that its center line TM is vertically oriented or in an angle between a horizontal and vertical orientation or plane, respectively.

With regard to the first embodiment of mounting/demounting tool unit U according to FIG. 1 and second embodiment of mounting/demounting tool unit U according to FIGS. 2 and 3, it has to be noted that identical element of these embodiments are provided with identical reference signs.

Tool carrier arm 10 made preferably from steel, has a rectangular- or square-shaped cross-section with a first end 10a and a second end 10b. With its first end 10a, tool carrier arm 10 can be mounted to a drive unit (not shown) for being adapted to be movable back and forth in a direction parallel to the orientation of its center line TM. At second end 10b, tool carrier arm 10 is provided with a fork 12 including a first tine 12a (cf. FIG. 2) and a second tine 12b (cf. FIG. 3) and a fork base 12c. Tines 12a, 12b are arranged at tool carrier arm 10 such that they extend parallel to each other and define together with fork base 12c a first space 14 being open in the upward and downward direction, referred to FIGS. 2 and 3. Moreover, a pivot axis 16 is fixed in both tines 12a, 12b such that the center line of pivot axis 16 extends vertically to the center line TM of tool carrier arm 10. As it can be seen from FIGS. 2 and 3, pivot axis 16 is arranged at least substantially in the longitudinally extending center lines of the respective side surfaces 10c, 10d of tool carrier arm 10 and close to second end 10b of tool carrier arm 10.

On the upper side 10e of tool carrier arm 10, a tool support surface 18 (cf. FIG. 3) is provided which extends from the edge of fork base 12c in the direction to first end 10a of tool carrier arm 10. Support surface 18 forms a first element of the tensioning and positioning means 70 for fulfilling the positioning functionality. As it can be seen in FIGS. 2 and 3, tool support surface 18 is formed by upper side 10e of tool carrier arm 10. It is in principal possible that tool support surface 18 can also be formed by a defined area of upper side 10e, for example by a recess formed in upper side 10e of tool carrier arm 10 in order to hold mounting/demounting tool 40 in the resting/operating position in a defined manner.

Mounting/demounting tool 40 includes a tool body 42 with a first end 42a facing in the direction of first end 10a of tool carrier arm 10, and a second end 42b facing in the opposite direction to its first end 42a, i.e. in the direction of second end 10b of tool carrier arm 10. Tool body 42 is preferably made from steel and has a rectangular cross-section. Tool body 42 is rotatably attached to pivot axis 16.

First end 42a of tool body 42 is part of two projections 44a, 44b which extend from tool body 42 to its first end 42a. Both projections 44a, 44b define also a clevis or fork, respectively, with two prongs wherein the prongs of this clevis are formed by both projections 44a, 44b. Projections 44a, 44b are arranged such that they define a second space 46 being open in the leftward and the rightward direction, referred to FIG. 2. As it can be seen in FIGS. 2 and 3, both pairs of tines or prongs 12a, 12b; 44a, 44b overlap each other for some extent so that the two forks or clevis, respectively, defined by the pair of tines 12a, 12b of tool carrier arm 10 and by the pair of projections 44a, 44b of mounting/demounting tool 40 interlock or mesh with each other.

Upper or first projection 44a of tool body 42 comprises a counter-support surface 48 facing to second projection 44b of tool body 42, and in particular to tool support surface 18 of tool carrier arm 10. Counter-support surface 48 forms another element of the tensioning and positioning means 70 for fulfilling the functionality of positioning of the tensioning and positioning means 70. As it can be seen from FIGS. 2 and 3, counter-support surface 48 encloses an angle with upper lateral surface 42c of tool body 42 (and the upper lateral surface of projection 44a), in particular an acute angle. The amount of this angle defines the resting/operating position of mounting/demounting tool 40 and thus the orientation of an extension being provided between tool body 42 and its second end 42b which is used for the demounting process. Between counter-support surface 48 and tool body 42, a further part surface not designated can be provided which extends at least partially parallel to the upper lateral surface 42c of tool body 42.

Second projection 44b is inversely design to first projection 44a. Thereby, the surface which corresponds to counter-support surface 48, forms an abutment surface 50 used for limiting the pivoting movement of mounting/demounting tool from the resting/operating position in the clockwise direction, referred to FIG. 2 (or the counter-clockwise direction if referred to FIG. 3).

Between tool body 42 and its second end 42b, an extension 52 is provided, which has the same design as the extension 52 of the first embodiment described above in conjunction with FIG. 1.

For fulfilling the functionality of tensioning, tensioning and positioning means 70 include a tension spring in form of a coil spring or a spiral wounded tension spring 72. Coil spring 72 has a first end 72a and a second end 70b. First end 72a is attached to tool carrier arm 10 whereas second end 72b is attached to tool body 42 of mounting/demounting tool 40. As it can be seen in FIG. 2, tension spring 72 urges mounting/demounting tool 40 in a position in which counter support surface 48 engages tool support surface 18 so that mounting/demounting tool 40 is in a resting position. Here, in this resting/operating position, tension spring 72 is still strained in contrast to coil spring 72 of the first embodiment. This resting position is simultaneously an operating position such that second end 42b of tool body 42 or finger tip of extension 52, respectively, can be brought in contact with a tyre bead of a tyre to be demounted from a rim of a vehicle wheel in the area of the rim edge and to urge that tyre bead out of the rim edge of said wheel rim during a demounting operation. Due to the firm engagement between support surface 18 and counter-support surface 48, a push force can be applied to push the tyre bead out of the rim edge. During the further demounting operation, mounting/demounting tool 40 can carry out a pivoting movement in the clockwise direction, referred to FIG. 2 (and in a counter-clockwise direction, referred to FIG. 3) such that first auxiliary guiding surface 54 is substantially oriented in a vertically direction (cf. FIG. 3). Thereby, extension 52 and in particular hook 56 can pass the tyre bead of tyre T (cf. FIG. 4) already separated from the rim edge of the wheel rim and hook 56 can grip the inner side of the tyre bead. Afterwards, mounting/demounting tool unit U can be moved upwardly, referred to FIGS. 2 and 3, and can draw the tyre bead gripped by hook 56 out of the rim of the wheel W.

Any forces acting on mounting/demounting tool 40 can be balanced by tensioning and positioning means 70 so that there is a firm contact between hook 56 and the tyre bead. Moreover, the step-shaped contour of extension 52, in particular first and second auxiliary guiding surfaces 54, 55 and step surfaces 52a, 52b can come in contact with the rim edge and avoid thereby any damaging of said rim edge due to their plane design. After the tyre bead has been drawn out of the rim and has been detached from hook 56, mounting/demounting tool 40 returns back in its resting/operating position shown in FIG. 2.

In a further alternative embodiment of mounting/demounting tool 40 (not shown), extension 53 is hook-shaped including guide surface 54 and hook 56. In this embodiment, finger tip or second end 42b has been omitted. Instead of finger tip 42b, hook-shaped extension 52 is provided with a protrusion extending downwardly from the lower hook surface, and provides the same functionality as disclosed in conjunction with finger tip 42b and guide surface 54. Said protrusion may separately be attached to hook-shaped extension 52, and may be formed completely from plastic, in order to avoid damages on rim R. Naturally, said protrusion may also contain a core-part of metal with a coating of plastic.

Figure 4:
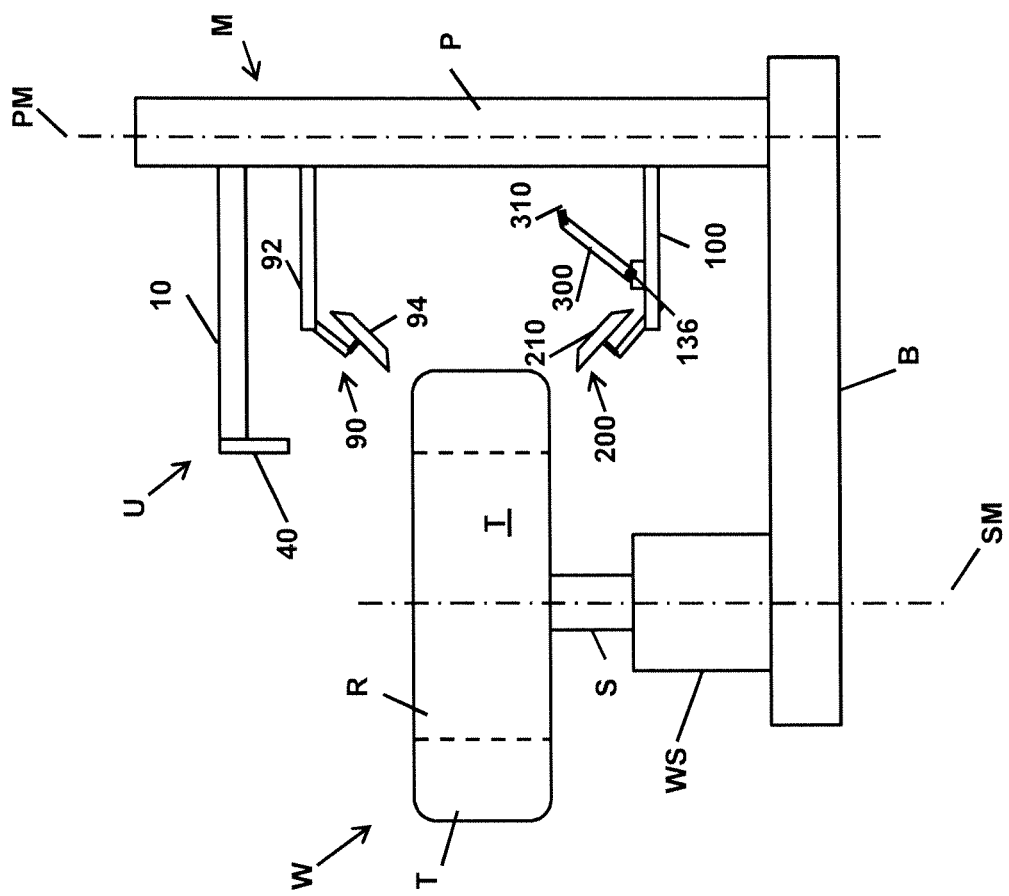
FIG. 4 is a schematic view to an embodiment of a tyre mounting/demounting machine according to the present invention.

In FIG. 4, a tyre mounting/demounting machine M according to the present invention is shown at which the inventive mounting/demounting tool unit U is provided. It has to be understood that both embodiments of the inventive mounting/demounting tool unit U may be used in mounting/demounting machine M.

Mounting/demounting machine M includes a machine base B and a wheel support WS with a shaft S on which a rim of a wheel W from which a tyre T is to be demounted or to which a tyre T is to be mounted, respectively, can rotatably be clamped. Wheel support WS and shaft S are arranged on machine base B such that center line SM of shaft S and wheel support WS extends vertically. The rim of wheel W clamped on shaft S, can be arranged at the free end of shaft S such that its midplane is horizontally oriented. In the casing of wheel support WS, a drive device, like an electric motor, is arranged for rotating shaft S and the rim of wheel W during the mounting and demounting procedure.

Moreover, on base B, a tool support post P is arranged such that center line PM of tool support post P extends at least substantially parallel to center line SM of wheel support WS and shaft S, respectively. Tool support post P has a horizontal distance to wheel support WS and shaft S such that a complete wheel W, i.e. including a rim R and a tyre T, can reversibly be mounted on shaft S and can freely be rotated by the aforesaid drive device without interference with support post P.

On tool support post P, inventive mounting/demounting tool unit U is arranged such that tool carrier arm 10 extends at least substantially horizontal wherein, at second end 10a of tool carrier arm 10, i.e. the free end of the cantilevered arranged tool carrier arm 10, mounting/demounting tool 40 is provided. Tool carrier arm 10 can reversibly be moved along tool support post P by a not shown drive device, like an electric motor or pneumatic or hydraulic cylinder/piston device, respectively. Furthermore, tool carrier arm 10 can be coupled to or can include a further drive device, like an electric motor or pneumatic or hydraulic cylinder/piston device, respectively, for at least reversibly moving mounting/demounting tool 40 in the horizontal direction. In principle, it is also possible that at least mounting/demounting tool 40 (but also a part or the whole tool carrier arm 10) can horizontally be moved by hand. Moreover, tool carrier arm 10 can pivotally be arranged at tool support post P such that tool carrier arm 10 can be pivoted in a horizontal plane wherein this pivot movement can be carried out by hand or by a drive device, respectively.

Mounting/demounting machine M includes additionally an upper and a lower bead breaker tool device 90, 200 for releasing the bead of a tyre T from the rim edge of a wheel rim. Both bead breaker tool devices 90, 200, include a bead breaker carrier arm 92, 100 extending at least substantially in the horizontal direction and being mounted to tool support post P in a cantilevered fashion. At the free ends of bead breaker carrier arms 92, 100, a bead breaker tool 94, 210 is rotatably mounted via a bar (not designated) in form of a truncated cone wherein the smaller diameter of the cone faces towards tool support post P as it can be seen in FIG. 4.

Both bead breaker tool devices 90, 200 can reversibly and independent from each other be moved along tool support post P by not shown drive devices, like electric motors or pneumatic or hydraulic cylinder/piston devices, respectively, wherein one drive devices can be provided for each of bead breaker tool devices 90, 200 or commonly for both devices 90, 200. Furthermore, bead breaker tool devices 90, 200 can be coupled or can include a further drive device, like an electric motor or pneumatic or hydraulic cylinder/piston device, respectively, for at least reversibly moving bead breaker tools 94, 210 in the horizontal direction. In principle, it is also possible that at least bead breaker tools 94, 210 (but also a part or the whole tool carrier arms 92, 100) can horizontally be moved by hand. Moreover, bead breaker carrier arms 92, 100 can pivotally be arranged at tool support post P such that both carrier arms 92, 100, or at least one of them, can be pivoted in a horizontal plane wherein this pivot movement can be carried out by hand or by a drive device, respectively.

Figure 5:
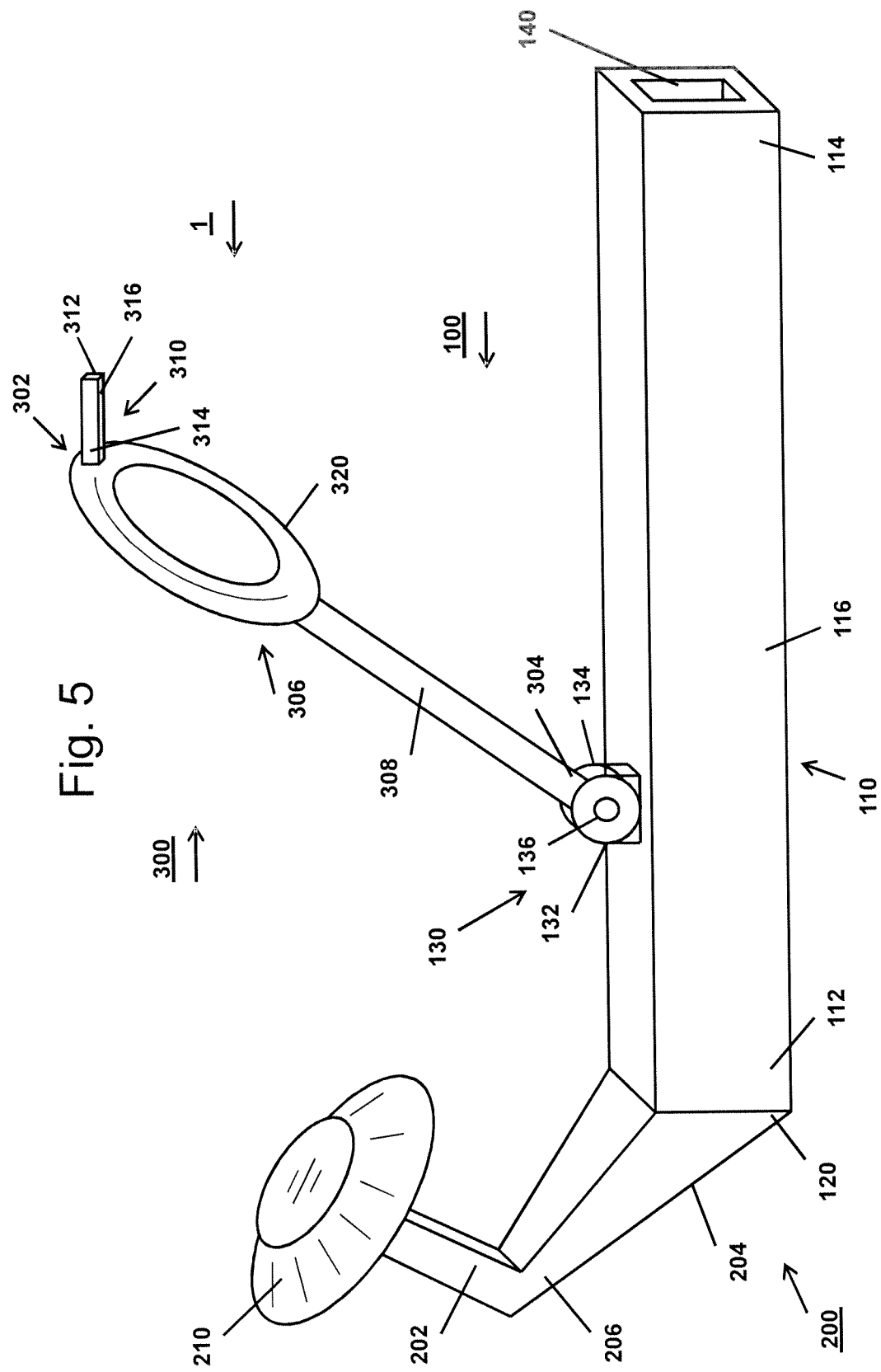
FIG. 5 is a schematic view to an embodiment of an inventive mounting/demounting tool assembly, with an inventive mounting support tool in the inoperative position.
Figure 6:
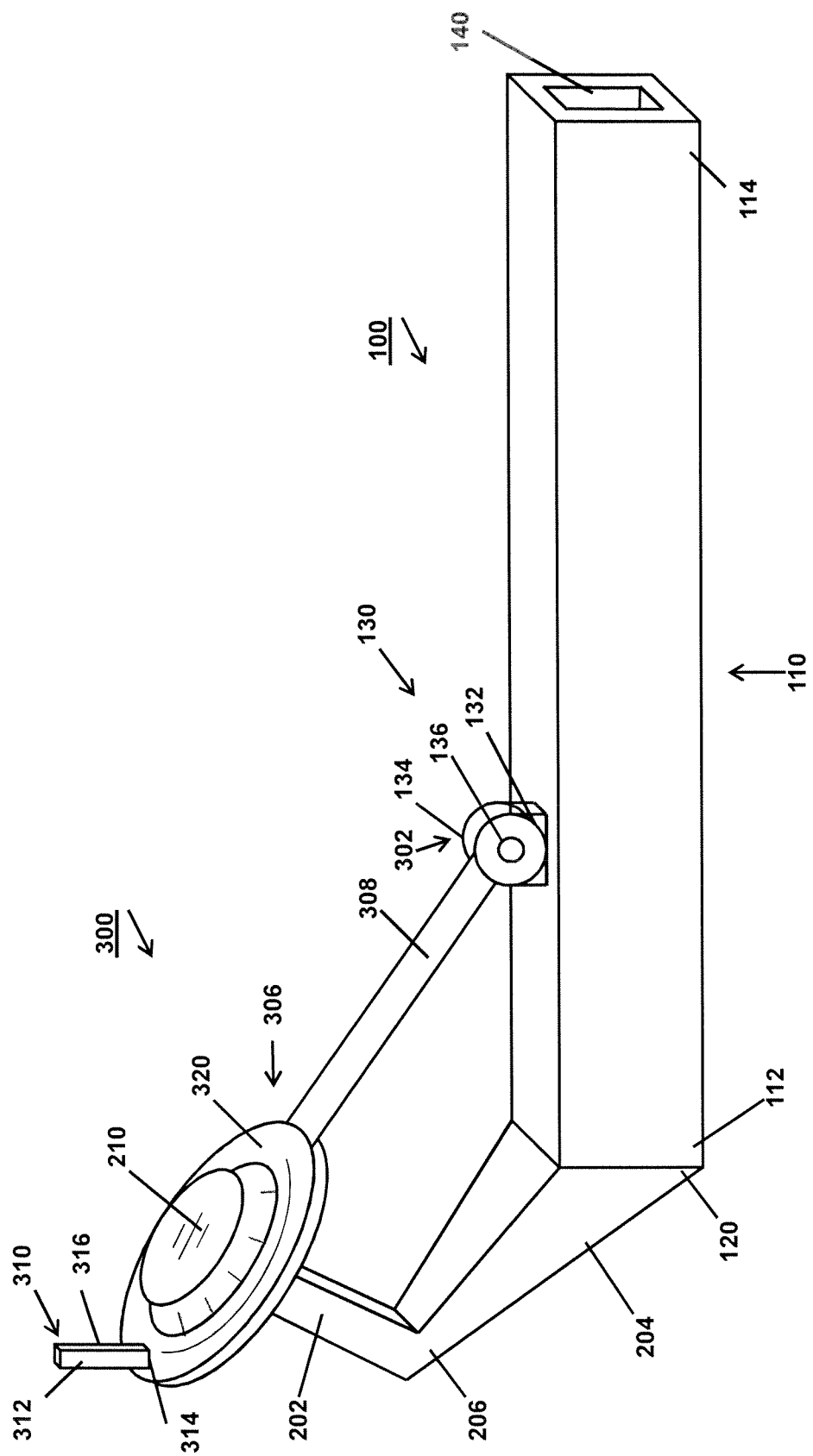
FIG. 6 is a schematic view to the embodiment of the mounting/demounting tool assembly of FIG. 5, with the mounting support tool in the operative position.

Lower bead breaker tool device 200 comprises a mounting support tool 300 which can be pivoted around a horizontally extending pivot axis 136, which may be the hinge bolt of a respective hinge, being arranged on the upper side of bead breaker carrier arm 100, from a resting position shown in FIGS. 4 and 5, in an operating position which is shown in FIG. 6 and in which mounting support tool 300 abuts closely on bead breaker tool 210. Pivot axis 136 is arranged vertically to the center line of bead breaker carrier arm 100 of lower bead breaker tool device 200.

With its lower end, mounting support tool 300 is pivotally arranged at pivot axis 136. At the opposite end, mounting support tool 300 is provided with a hook-shaped mounting support tool element 310 used for drawing the tyre bead TB of a tyre T to be mounted to a rim R of a wheel W, over the first rim edge RE, the upper rim edge RE, in the direction to the lower rim edge RE (cf. FIG. 7). For closely abutting to bead breaker tool 210, mounting support tool 300 comprises between its lower end and mounting support tool element 310 an eye ring or ring-shaped portion the inner diameter of which corresponds at least substantially to the medium diameter of the truncated cone of bead breaker tool 210. It has to be noted that the eye ring must not be completely closed, but can also be interrupted so that, for example, the truncated cone of bead breaker tool 210 is only enclosed by two-thirds of its outer diameter.

Mounting support tool 300 is used to assist the mounting procedure of a tyre T to a rim of a wheel W. For this purpose, mounting support tool 300 is pivoted from its resting position shown in FIGS. 4 and 5, to its operating position shown in FIG. 5, in which it abuts closely on bead breaker tool 210 of the lower bead breaker tool device 200. Before or subsequently, tyre T to be mounted, is placed on the rim R of wheel W such that at least a part of the lower tyre bead TB has passed upper rim edge RE of the wheel rim. Afterwards, bead breaker tool device 200 is moved upwardly along support post P and hook-shaped mounting support tool element 310 is brought in contact with the lower bead TB of tyre T. Then, bead breaker tool device 200 is moved downwardly, wherein hook-shaped mounting support tool element 310 draws lower tyre bead TB of tyre T downwardly, wherein the passing of the remaining rest of the lower tyre bead TB of tyre T can be assisted by pushing tools not shown, or by upper bead breaker tool device 90 and/or by rotating the rim R via shaft S. After the lower tyre bead TB has been drawn in its lower position close to the lower rim edge RE of wheel rim R, hook-shaped mounting support tool element 310 is decoupled from said lower bead TB and is pivoted in its resting position shown in FIGS. 4 and 5.

Mounting support tool 300 according to the embodiment of FIG. 4, may be mounted to a carrier arm 100 of a lower bead breaker tool device 200. Alternatively, a mounting/demounting tool assembly 1 may be provided, which replaces a conventional lower bead breaker tool device. An embodiment of such a mounting/demounting tool assembly 1 is disclosed in conjunction with FIGS. 5 to 7.

FIG. 5 is a schematic view to an embodiment of a mounting/demounting tool assembly 1, with a mounting support tool 300 in the inoperative position.

Mounting/demounting tool assembly 1 comprises a carrier unit 100, a bead breaker tool device 200 and a mounting support tool 300. In FIG. 5, bead breaker tool device 200 is in its operative position, whereas mounting support tool 300 is in its inoperative position.

As it can be seen in FIG. 5, carrier arm 100 has an at least approximately horizontally arranged carrier arm portion 110, which has a first or left end 112 and a second or right end 114, and a straight mid portion 116. Carrier arm portion 110, according to FIG. 5, has a rectangular cross section including a top surface 118, which can be made of steel.

On top surface 118 of carrier arm portion 110, a second support means 130 for receiving mounting support tool 300 is provided. Support means 130, according to this specific embodiment, are in the form of a hinge having a first hinge portion 132 which is fixedly attached to top surface 118 of carrier arm portion 110, and a second hinge portion 134 mounted to mounting support tool 300. First and second hinge portions 132, 134 of support means or hinge 130, are pivotally connected to each other by a hinge bolt 136. Hinge 130 allows a pivot movement of mounting support tool 300 about hinge bolt 136, which is at least approximately horizontally arranged and which extends in a direction approximately rectangular 1s to the longitudinal extension of carrier arm portion 110 and vertical to a plane extending through carrier arm portion 110.

Bead breaker tool device 200 for loosening a tyre bead TB from a rim edge RE of a wheel rim R has a first end 202 with a bead breaker tool element 210 in the form of a truncated cone. Bead breaker tool element or truncated cone 210 is preferably rotatable attached to first end 202 of bead breaker tool device 200. Bead breaker tool device 200 further has a mid-portion 206 between its first and second ends 202, 204. Mid-portion 206 is curved such that the upper border or edge of the outer surface of cone 210 is aligned at least approximately in a horizontal plane, with its base surface facing away from carrier arm portion 110, and its top surface facing upwardly and towards carrier arm portion 110, such that said upper border or edge comes in contact with the tyre bead TB to be loosened.

Bead breaker tool device 200 has a second end 204, by means of which bead breaker tool 200 is mounted to the first end 112 of carrier arm portion 110 of carrier unit 100. According to the embodiment of tyre mounting/demounting tool assembly 1 of FIG. 5, bead breaker tool device 200 is detachably mounted to first end 112 of carrier arm portion 110 by first support means 120 for reversibly accommodating bead breaker tool device 200, and which comprise an insertion portion provided at second end 204 of bead breaker tool device 200, which is inserted into a respective receiving portion provided on first end 112 of carrier arm portion 110 (both are not visible in FIG. 5). Naturally, bead breaker tool device 200 may also be fixedly attached to the first end 112 of carrier arm portion 110 with its second end 204, e.g. by welding or the like.

In a specific configuration of mounting/demounting tool assembly 1, first support means 120 may also realized by a hinge, wherein a first hinge member is attached to first end 112 of carrier arm portion 110 and a second hinge member is attached to second end 204 of bead breaker tool device 200. Bead breaker tool device 200 is than pivotally attached to carrier arm portion 110, and may reversibly pivoted between the operative position and an inoperative position.

Mounting support tool 300 has a first end 302, a second end 304 and a mid-portion 306. Mounting support tool 300 is pivotally attached to tool carrier arm portion 110 by its first end, at which second hinge portion 134 of hinge 130 is provided, which forms second support means 130 for receiving or bearing mounting support tool 300.

Figure 7:
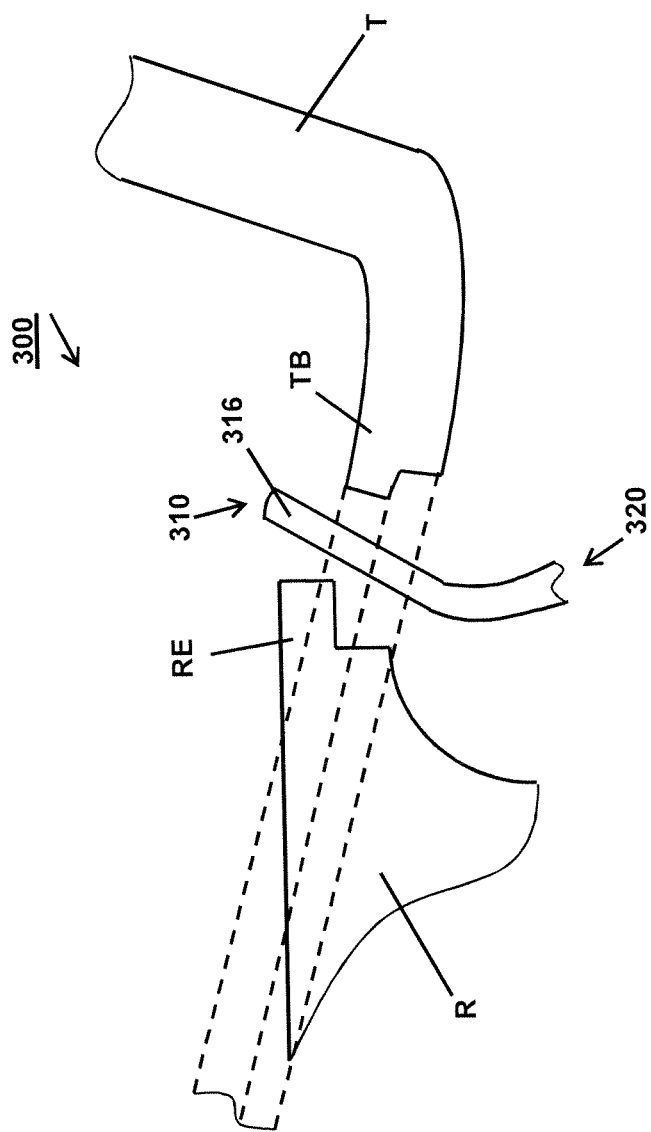
FIG. 7 is a detailed view to the mounting support tool element of the mounting support tool in the operative position.

Second end 304 of mounting support tool 300 is formed by a mounting support tool element 310 which in operation engages at least one tyre bead TB of a tyre T to be mounted, for mounting said tyre bead TB to a rim edge RE of a wheel rim R (as shown in FIG. 7). Mounting support tool element 310 has a longitudinally extending body of an at least approximately rectangular cross section, with a first end 312 and a second end 314, and a guiding surface 316 for guiding the at least one tyre bead TB of the tyre T to be mounted on the rim R. Guiding surface 316 is formed by the surface of mounting support tool element 310, facing towards tool carrier arm portion 110, when mounting support tool 300 is in its inoperative position, particularly, facing towards the second end 114 of carrier arm portion 110. Mounting support tool element 310 is attached to mid-portion 306 of mounting support tool 300 by its second end 314.

Mid-portion 306 of mounting support tool 300 includes an at least approximately ring-shaped portion 320, which forms an engagement portion being arranged close to or in the region of the second end 304 of mounting support tool 300. The circular shape of ring-shaped portion 320 is congruent to the shape of a plane through truncated cone 210 of bead breaker tool device 200 and parallel to its base surface. The plane in which ring-shaped portion 320 extends, or the plane of the ring, is at least approximately rectangular aligned to a plane extending vertically through carrier arm portion 110. The size of ring-shaped portion 320, and its opening, respectively, is selected to match with the outer diameter of at least one section of bead breaker tool element or truncated cone 210 of bead breaker tool device 200. A rod-shaped portion 308 extends between ring-shaped portion 320 and second end 304 of mounting support tool 300, the length of which is adapted to the distance between truncated cone 210 of bead breaker tool device 200 and the position of second support means or hinge 130, such that ring-shaped portion 320 is supported by truncated cone 210 of bead breaker tool device 200, when in the operative position (cf. FIG. 6).

Mounting support tool 300 may be made of any suitable material. It is preferred that mounting support tool 300 is made of metal. In order to avoid damages of tyre bead TB, mounting support tool element 310 may additionally be provided with a coating, e.g. of plastic.

Further according to FIG. 5, right end 114 of carrier arm portion 110 is provided with an accommodation portion 140 in the form of a blind hole having an approximately rectangular cross-section. Accommodation portion 140 extends from the outer end of second end 114 of carrier arm portion 110 into carrier arm portion 110 along its central axis. The length or depth of accommodation portion 140 corresponds to a respective insertion portion provided on the tool carrier arm of a mounting/demounting machine M, to which mounting/demounting tool assembly 1 may be attached (cf. FIG. 4).

Naturally, respective securing elements have to be provided for securing mounting/demounting tool assembly 1 when attached to the tool carrier arm of the mounting/demounting machine M. It is also possible that carrier arm portion 110 is provided with an insertion portion and that the tool carrier arm of the mounting/demounting machine M comprises a respective accommodation portion.

Insertion portion and accommodation portion may have other than the above described configurations. Essential is a form-fit coupling between mounting/demounting tool assembly 1 and the tool carrier arm of the mounting/demounting machine M, for a correct positioning and support of mounting/demounting tool assembly 1 on said tool carrier arm.

FIG. 6 is a schematic view to the embodiment of the mounting/demounting tool assembly 1 of FIG. 5, with the mounting support tool 300 in the operative position.

As it can be seen in FIG. 6, in its operative position, mounting support tool 300 is pivoted towards bead breaker tool device 200, about hinge bolt 136 and in a plane extending vertically and in the longitudinal extension of carrier arm portion 110. In the operative position, truncated cone 210 of bead breaker tool device 200 engages ring-shaped portion 320, forming an engagement portion of mounting support tool 300, and at least partially extends there trough. Ring-shaped portion 320, and thus, mounting support tool 300, is supported by bead breaker tool device 200, when in the operative position.

As it further can be seen in FIG. 6, in the operative position, mounting support tool element 310 is arranged at ring-shaped portion 210 such that it faces upwardly, with guiding surface 316 facing towards second end 114 of carrier arm portion 110. That means that guiding surface 316 faces away from rim R to which a tyre T has to be mounted. Mounting support tool element 310 and rod-shaped portion 308 are arranged in the plane extending vertically and in the longitudinal extension of carrier arm portion 110, or in the pivot plane, but with an angle with regard to their longitudinal extension. This angle ensures the correct positioning of mounting support tool element 310 with respect to rim R and tyre bead TB of the tyre T to be mounted (cf. FIG. 7).

As it further can be seen in FIG. 6, in the operative position, ring-shaped portion 320 of mounting support tool 300 is at least approximately parallel to the base surface of truncated cone 210 of bead breaker tool device 200, enabling a ring-shaped contact between truncated cone 210 and ring-shaped portion 320.

FIG. 7 is a detailed view to the mounting support tool element 310 of the inventive mounting support tool 300 in the operative position, and arranged closed to the rim edge RE of rim R to which tyre T has to be mounted.

Mounting support tool element 310 of mounting support tool 300 is positioned between rim edge RE of rim R and tyre bead TB of tyre T to be mounted, and in an angle relative to the vertical axis of rim R such that first end 312 of mounting support tool element 310 slopes towards tyre bead TB. Guiding surface 316 faces towards tyre bead TB of tyre T.

The length of mounting support tool element 310 and the angle between mounting support tool 310 and rod-shaped portion 308, or ring-shaped portion 320, respectively, are selected such mounting support tool element 310 is positioned at least approximately vertically above bead breaker tool element or truncated cone 210, particularly, approximately vertically above the edge of the base surface of truncated cone 210, when mounting support tool 300 is in the operative position, for enabling a correct contact between mounting support tool element 310 and tyre bead TB during the mounting operation. This arrangement of mounting support tool element 310 ensures a correct guidance of tyre bead TB for passing rim edge RE during the mounting operation without damaging tyre bead TB or rim edge RE.

For mounting at least one tyre bead TB of a tyre T on a rim R, said rim R is positioned and clamped on shaft S of wheel support WS. Thereafter, mounting/demounting tool assembly 1 with mounting support tool 300 in its operative position as shown in FIG. 6, is moved towards the upper rim edge RE of rim R. Mounting support tool element 310 is positioned close to rim edge RE and laterally thereto. A tyre T to be mounted is placed on rim R and with a portion of its lower tyre bead TB encompassing mounting support tool element 310, as shown in FIG. 7. With tyre T in this position, rim R is rotated about its vertical axis. By rotating rim R about at least one complete revolution, the lower tyre bead TB, guided by guide surface 316 of mounting support tool element 310, is moved over upper rim edge RE of rim R. Thereafter, carrier arm 100 of mounting/demounting tool assembly 1 is lowered for disengaging mounting support tool 300 from tyre T.

The further mounting process is executed by mounting/demounting tool unit U which engages upper tyre bead TB of tyre T for urging upper tyre bead TB over upper rim edge RE of rim R. The pivot movement of mounting support tool 300 and/or bead breaker tool device 200 may manually be executed, which reduces the control amount for the mounting/demounting machine M. Naturally additional drive means, like piston/cylinder drives may be provided for pivotally moving mounting support tool 300 and/or bead breaker tool device 200, which may easily be integrated into an existing control device, or which may also manually be activated.

REFERENCES

B machine base
M mounting/demounting machine
P support post
PM center line
R rim
RE rim edge
S shaft
SM center line
T tyre
TB tyre bead
TM center line
U inventive mounting/demounting tool unit
W wheel
WS wheel support
1 mounting/demounting tool assembly
10 tool carrier arm
10a,b first end (10a) and a second end (10b) of tool carrier arm
10c,d respective side surfaces
10e upper side of tool carrier arm
12 fork
12a,b first tine (12a) and second tine (12b)
12c fork base
14 first space
16 pivot axis
18 tool support surface
40 a mounting/demounting tool
42 tool body
42a,b first end (42a) second end (42b)
44a,b projections
46 second space
48 support surface, positioning element
50 abutment surface, positioning element
52 extension
52a,b step surfaces
54 first auxiliary guiding surface
55 second auxiliary guiding surface
56 hook
56a hook opening
70 tensioning and positioning means
72 coil spring, tensioning element
72a, b first end (72a) second end (72b)
80, 82 holding elements
90 upper bead breaker tool device
92 bead breaker carrier arm
94 bead breaker tool
100 bead breaker carrier arm
110 carrier arm portion
112 first end 112
114 second end 114
116 straight mid portion
118 top surface
120 first support means
130 support means, hinge
132 first hinge portion
134 second hinge portion
136 hinge bolt
140 accommodation portion
200 lower bead breaker tool device
202 first end
204 second end
206 mid-portion
210 bead breaker tool element
300 mounting support tool
302 first end
304 second end
306 mid-portion
308 rod-shaped portion
310 mounting support tool element 312 first end
314 second end
316 guiding surface
320 ring-shaped portion
136 pivot axis

The invention claimed is:

1. A mounting/demounting machine for mounting a tyre to or demounting a tyre from a rim of a vehicle wheel, the mounting/demounting machine having:
   a tool support post;
   a wheel support configured to rotatably and reversibly hold a rim of a vehicle wheel from which a tyre is to be demounted or to which a tyre is to be mounted, the rim of the vehicle wheel arranged at a distance from the tool support post, the wheel support having a vertically oriented center line extending at least substantially parallel to a center line of the tool support post; and
   a mounting/demounting tool unit including:
      a single-body tool carrier arm having a substantially horizontally oriented center line, a first end nonpivotably connected directly to the tool support post so that the tool carrier arm is movable along the tool support post, the tool carrier arm having a longitudinal extension bridging the distance between the tool support post and the rim of the vehicle wheel;
      a pivot axis extending through a second end of the tool carrier arm;
      a mounting/demounting tool having a single-body tool body, comprising a tool body first end, a tool body second end, and a hook arranged in the region of the tool body second end, wherein the region of the tool body first end is pivotally mounted directly to the tool carrier arm such that the tool body is rotatably attached to the pivot axis; and
      a tensioning element having a first end connected to the tool carrier arm and a second end connected to the mounting/demounting tool, the tensioning element configured to reversibly urge the mounting/demounting tool in a resting/operating position.

2. The mounting/demounting machine according to claim 1, wherein the tensioning element is further configured to position the mounting/demounting tool in said resting/operating position when the tensioning element is in a completely relaxed state and does not apply a tension force to the mounting/demounting tool.

3. The mounting/demounting machine according to claim 1, further comprising a positioning element configured to position the mounting/demounting tool in said resting/operating position.

4. The mounting/demounting machine according to claim 3, wherein the positioning element is provided at the tool carrier arm and the mounting/demounting tool, and the tensioning element is attached to the tool carrier arm and the mounting/demounting tool.

5. The mounting/demounting machine according to claim 4,
   wherein the tool carrier arm is provided with a tool support surface, and the mounting/demounting tool has a counter-support surface in the region of the tool body first end, and
   wherein the tool support surface and the counter-support surface form at least part of the positioning element such that, in the resting/operating position, the counter-support surface of the mounting/demounting tool is in engagement with the tool support surface of the tool carrier arm.

6. The mounting/demounting machine according to claim 5, wherein the second end of the tool carrier arm is provided with a fork having first and second tines and a fork base connecting the tines, wherein the tool body is pivotally arranged in a space defined by the tines and the fork base.

7. The mounting/demounting machine according to claim 5, wherein the tool body first end has at least one projection at which its counter-support surface is arranged such that it faces towards the tool support surface of the tool carrier arm.

8. The mounting/demounting machine according to claim 4, wherein the tool body second end of the mounting/demounting tool is part of an extension of the mounting/demounting tool in the form of an at least slightly curved finger, a fingertip of which is aligned in a direction intersecting the center line of the tool carrier arm.

9. The mounting/demounting machine according to claim 1, wherein the tool body second end has at least one flat guiding surface facing away from the tool carrier arm.

10. The mounting/demounting machine according to claim 1, wherein the tool body second end of the mounting/demounting tool has a step-shaped design.

11. The mounting/demounting machine according to claim 1, wherein the hook faces towards the tool carrier arm and a hook opening faces in a direction of the center line of the tool carrier arm.

12. The mounting/demounting machine according to claim 1, wherein the mounting/demounting tool unit is reversibly movable along the tool support post such that at least one component of the movement of the mounting/demounting tool unit is aligned at least approximately parallel to the center line of the tool support post.

13. The mounting/demounting machine according to claim 1, further comprising:
   a bead breaker carrier arm having a first end, and a second end, wherein the first end of the bead breaker carrier arm is mounted to the tool support post and the second end of the bead breaker carrier arm carries a bead breaker tool, and
   a mounting support tool mounted to the bead breaker carrier arm in the region of the second end of the bead breaker carrier arm and reversibly pivotable from a resting position into an operating position around a pivot axis, wherein a center line of the mounting support tool extends vertically to a center line of the bead breaker carrier arm.

14. The mounting/demounting machine of claim 1, wherein the tool body is pivotally mounted to the tool carrier arm such that it can only perform a pivoting movement with respect to the tool carrier arm.

15. The mounting/demounting machine of claim 1, wherein during a mounting/demounting operation the pivoting movement of the tool body is caused by interaction of the tool body with the rim of the vehicle wheel and the tire to be mounted/demounted from the rim.

16. A mounting/demounting tool unit for mounting a tyre to or demounting a tyre from a rim of a vehicle wheel and for being adapted to be attached to a tyre mounting/demounting machine having a support structure for the mounting/demounting tool unit, and a wheel support arranged at a distance from the support structure, the mounting/demounting tool unit including:
   a single-body tool carrier arm having a first end connected to the support structure along which the tool carrier arm is movable substantially parallel to a center line of the wheel support, the tool carrier arm having a longitudinal extension bridging the distance between the support structure and the rim of the vehicle wheel;

a pivot axis extending through a second end of the tool carrier arm;

a mounting/demounting tool having a single-body tool body, comprising a tool body first end, a tool body second end, and a hook arranged in the region of the tool body second end, wherein the region of the tool body first end is pivotally mounted directly to the tool carrier arm such that the tool body is rotatably attached to the pivot axis;

a tensioning element having a first end connected to the tool carrier arm and a second end connected to the mounting/demounting tool, the tensioning element configured to reversibly urge the mounting/demounting tool in a resting/operating position; and a positioning element configured to position the mounting/demounting tool in said resting/operating position.

17. A mounting/demounting machine for mounting a tyre to or demounting a tyre from a rim of a vehicle wheel, the mounting/demounting machine having:

a tool support post;

a wheel support configured to rotatably and reversibly hold a rim of a vehicle wheel from which a tyre is to be demounted or to which a tyre is to be mounted, the rim of the vehicle wheel arranged at a distance from the tool support post, the wheel support having a center line extending at least substantially parallel to a center line of the tool support post; and a mounting/demounting tool unit including:

a single-body tool carrier arm having a first end non-pivotably connected directly to the tool support post so that the tool carrier arm is movable along the tool support post, and a center line arranged substantially perpendicularly to the center line of the wheel support, the tool carrier arm having a longitudinal extension bridging the distance between the tool support post and the rim of the vehicle wheel;

a pivot axis extending through a second end of the tool carrier arm;

a mounting/demounting tool having a single-body tool body, comprising a tool body first end, a tool body second end, and a hook arranged in the region of the tool body second end, wherein the region of the tool body first end is pivotally mounted directly to the tool carrier arm such that the tool body is rotatably attached to the pivot axis; and a tensioning element having a first end connected to the tool carrier arm and a second end connected to the mounting/demounting tool, the tensioning element configured to reversibly urge the mounting/demounting tool in a resting/operating position.

* * * * *